Patented Sept. 30, 1952

2,612,504

UNITED STATES PATENT OFFICE 2,612,504

THIANAPHTHYLTHIAZOLYL DISULFIDES AND PROCESS FOR PREPARING SAME

William S. Emerson and Tracy M. Patrick, Jr., Dayton, Ohio, assignors to Monsanto Chemical Company, St. Louis, Mo., a corporation of Delaware No Drawing. Application November 21, 1950, Serial No. 196,951

14 Claims. (Cl. 260—302)

This invention relates to organic sulfur compounds and provides new derivatives of thiazolyl disulfide and a method of producing the same.

According to the invention there are produced valuable thianaphthylthiazolyl disulfide compounds by contacting certain 3-haloacetylthianaphthene compounds with ammonium dithiocarbamate substantially according to the scheme:

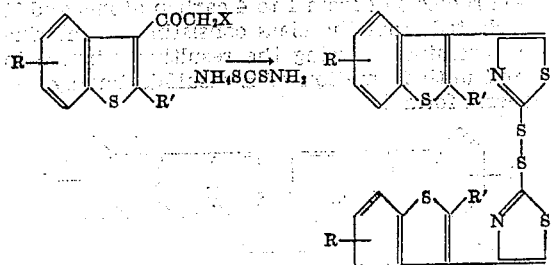

in which R and R' are selected from the class consisting of hydrogen, chlorine, bromine and alkyl radicals of from 1 to 4 carbon atoms and X is selected from the class consisting of chlorine and bromine. As illustrative of 3-haloacetylthianaphthenes which may be reacted with ammonium dithiocarbamate may be mentioned 3-chloroacetylthianaphthene or 3-bromoacetylthianaphthene to yield 4-(3'-thianaphthyl)-2-thiazolyl disulfide; 5- methyl- 3- chloroacetylthianaphthene to yield 4-(5'-methyl-3'-thianaphthyl)-2-thiazolyl disulfide, 6-butyl-3-bromoacetylthianaphthene to yield 4-(6'-butyl-3'-thianaphthyl)-2-thiazolyl disulfide, 2-chloro-3-chloroacetylthianaphthene to yield 4-(2'-chloro-3'-thianaphthyl)-2-thiazolyl disulfide, 5-chloro-2-methyl-3-chloroacetylthianaphthene to yield 4-(5'- chloro-2'- methyl-3'- thianaphthyl)- 2- thiazolyl disulfide, etc.

The 3-haloacetylthianaphthenes are readily obtainable by chlorinating or brominating 3-acetylthianaphthene with the appropriate halogen, at low temperatures and in the presence of a solvent such as chloroform, carbon tetrachloride, etc.

Reaction of the haloacetylthianaphthenes with ammonium dithiocarbamate to yield the present thianaphthylthiazolyl disulfides is effected substantially as follows: The reactants are gradually added to an inert liquid diluent either at room temperature or with cooling. Since the reaction liberates some heat and generally raises the temperature, ordinarily no extraneous heat need be applied. The mixture is then allowed to stand at room temperature for a time of say, several hours to a week or longer depending upon the reactivity of the halide. The slurry of disulfide which is formed in the reaction mixture may be recovered by treating the mixture with ice, diluting with water and filtering. The precipitated disulfide may then be further purified by washing, drying, and if desired, by recrystallizing from a solvent such as benzene.

Good yields of the thianaphthylthiazolyl disulfides are generally obtained irrespective of the reactant proportions employed. In order to assure complete reaction of the less readily available haloacetylthianaphthene, however, it is advantageous to employ an excess of the dithiocarbamate. The quantity of solvent or suspending agent employed is likewise immaterial, though care should be employed to use sufficient diluent to permit thorough solution or adequate suspension of the reactants.

Any polar solvent or suspending medium which is inert with respect to the reacting constituents or product may be employed. Suitable solvents may be, e. g., ethanol, methanol, isopropanol, water, dioxane, ethylene glycol, propylene glycol, the monoalkyl ethers of the glycols such as ethylene glycol monomethyl ether, etc.

The present thianaphthylthiazolyl disulfides are stable, rather high-melting crystalline to waxy materials which may be advantageously employed for a variety of industrial uses. They may be advantageously employed as petroleum lubricant additives, as modifiers in the preparation of synthetic rubbers and as medicinals; and they are particularly valuable as intermediates for the preparation of rubber vulcanization accelerators. Thus as disclosed in our copending application, Serial No. 196,953, filed November 21, 1950, upon treatment of the present disulfides with a reducing agent they are easily converted to give essentially quantitive yields of thianaphthylmercaptothiazoles, which compounds are very valuable rubber vulcanization accelerators.

The invention is further illustrated, but not limited, by the following example.

Example 4-(3'-thianaphthyl)-2-thiazolyl disulfide.—A suspension of 21 g. of 3-chloroacetylthianaphthene and 77 g. of ammonium dithiocarbamate in 325 cc. of ethanol was allowed to stand with occasional shaking for eight days. Then the mixture was cooled in ice, diluted with 325 cc. of water and filtered. The precipitate was washed three times with water and sucked as dry as possible. It then was suspended in benzene which was boiled for thirteen hours while the evolved water was collected in a Dean and Stark trap. The resulting suspension was heated to boiling and filtered hot. When the filtrate was chilled, crystals appeared. These were separated by filtration, washed with benzene and dried to give 0.5 g. (2%) of crude 4-(3'-thianaphthyl)-2-mercaptothiazole, M. P. 212–214° C. One recrystallization from a mixture of benzene and ethanol raised the melting point to 221–223° C. Dilution of the original filtrate with hexane precipitated 4.5 g. of crude 4-(3'-thianaphthyl)-2-thiazolyl disulfide, M. P. 109–117° C. The solid which had been filtered from the original hot benzene suspension was crystallized from a mixture of ethanol and dioxane. Two crops were collected: I, 10.5 g., M. P. 126–127° C. and II, 2.0 g., M. P. 116–120° C. The total yield of crude 4-(3'-thianaphthyl)-2-thiazolyl disulfide was 17 g. (69%). When a sample of fraction I was crystallized successively from benzene, ethanol and dioxane, and benzene and ethanol, the melting point remained the same.

|  | Calcd. for $C_{22}H_{12}N_2S_6$ | Found |
|---|---|---|
| Percent C | 53.2 | 53.5 |
| Percent H | 2.42 | 2.24 |

Operating as in the above example other haloacetylthianaphthenes, e. g. 3-bromoacetylthianaphthene, 2-methyl-3-chloroacetylthianaphthene or 5-chloro-3-chloroacetylthianaphthene may be similarly reacted with ammonium dithiocarbamate to yield the correspondingly substituted thianaphthylthiazolyl disulfides. Also, instead of ethanol other non-reactive polar liquids may be employed as suspending media for the reactants. When the thianaphthylthiazolyl disulfides are to be employed for the preparation of thianaphthylmercaptothiazoles, careful purification of the disulfides as shown in the example, need not be employed, since the major impurity in the crude disulfide is generally the thianaphthylmercaptothiazole.

What we claim is:

1. Disulfides having the general formula

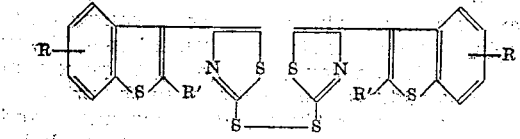

in which R and R' are selected from the class consisting of hydrogen, chlorine, bromine and alkyl radicals of from 1 to 4 carbon atoms.

2. 4-(3'-thianaphthyl)-2-thiazolyl disulfide.
3. 4-(6'-chloro-3'-thianaphthyl)-2-thiazolyl disulfide.
4. 4-(6'-methyl-3'-thianaphthyl)-2-thiazolyl disulfide.
5. 4-(5'-methyl-3'-thianaphthyl)-2-thiazolyl disulfide.
6. 4-(4'-chloro-3'-thianaphthyl)-2-thiazolyl disulfide.
7. The method which comprises contacting ammonium dithiocarbamate with a haloacetylthianaphthene having the general formula

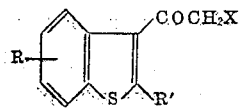

in which R and R' are selected from the class consisting of hydrogen, chlorine, bromine and alkyl radicals of from 1 to 4 carbon atoms and X is selected from the class consisting of chlorine and bromine, allowing the resulting mixture to stand until formation of a disulfide having the general formula

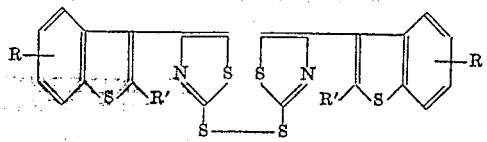

in which R and R' are selected from the class consisting of hydrogen, chlorine, bromine and alkyl radicals of from 1 to 4 carbon atoms, and recovering said disulfide from the resulting reaction product.

8. The method which comprises contacting ammonium dithiocarbamate, in the presence of an inert liquid diluent, with a haloacetylthianaphthene having the general formula

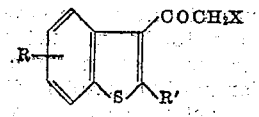

in which R and R' are selected from the class consisting of hydrogen, chlorine, bromine and alkyl radicals of from 1 to 4 carbon atoms and X is selected from the class consisting of chlorine and bromine, allowing the resulting mixture to stand until formation of a disulfide having the general formula

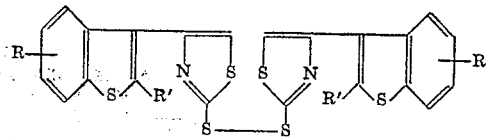

in which R and R' are selected from the class consisting of hydrogen, chlorine, bromine and alkyl radicals of from 1 to 4 carbon atoms, and recovering said disulfide from the resulting reaction product.

9. The method which comprises contacting 3-chloroacetylthianaphthene with ammonium dithiocarbamate in the presence of an inert liquid diluent, allowing the resulting mixture to stand until formation of 4-(3'-thianaphthyl)-2-thiazolyl disulfide and recovering said disulfide from the reaction product.

10. The method which comprises contacting 3-bromoacetylthianaphthene with ammonium dithiocarbamate in the presence of an inert liquid diluent, allowing the resulting mixture to stand until formation of 4-(3'-thianaphthyl)-2-thiazolyl disulfide and recovering said disulfide from the reaction product.

11. The method which comprises contacting 3-chloroacetyl-6-chlorothianaphthene with ammonium dithiocarbamate in the presence of an inert liquid diluent, allowing the resulting mixture to stand until formation of 4-(6'-chloro-3'-thianaphthyl)-2-thiazolyl disulfide and recovering said disulfide from the reaction product.

12. The method which comprises contacting 3-chloroacetyl-6-methylthianaphthene with ammonium dithiocarbamate in the presence of an inert liquid diluent, allowing the resulting mixture to stand until formation of 4-(6'-methyl-3'-thianaphthyl)-2-thiazolyl disulfide and recovering said disulfide from the reaction product.

13. The method which comprises contacting 3-chloroacetyl-5-methylthianaphthene with ammonium dithiocarbamate in the presence of an inert liquid diluent, allowing the resulting mixture to stand until formation of 4-(5'-methyl-3'-thianaphthyl)-2-thiazolyl disulfide and recovering said disulfide from the reaction product.

14. The method which comprises contacting 3-chloroacetyl-4-chlorothianaphthene with ammonium dithiocarbamate in the presence of an inert liquid diluent, allowing the resulting mixture to stand until formation of 4-(4'-chloro-3'-thianaphthyl)-2-thiazolyl disulfide and recovering said disulfide from the reaction product.

WILLIAM S. EMERSON.
TRACY M. PATRICK, Jr.

REFERENCES CITED

The following references are of record in the file of this patent:

UNITED STATES PATENTS

| Number | Name | Date |
| --- | --- | --- |
| 2,196,607 | Mathes | Apr. 9, 1940 |